No. 826,534. PATENTED JULY 24, 1906.
C. G. & E. J. BURKE.
TELEPHONE SYSTEM.
APPLICATION FILED AUG. 6, 1904. RENEWED MAY 25, 1906.
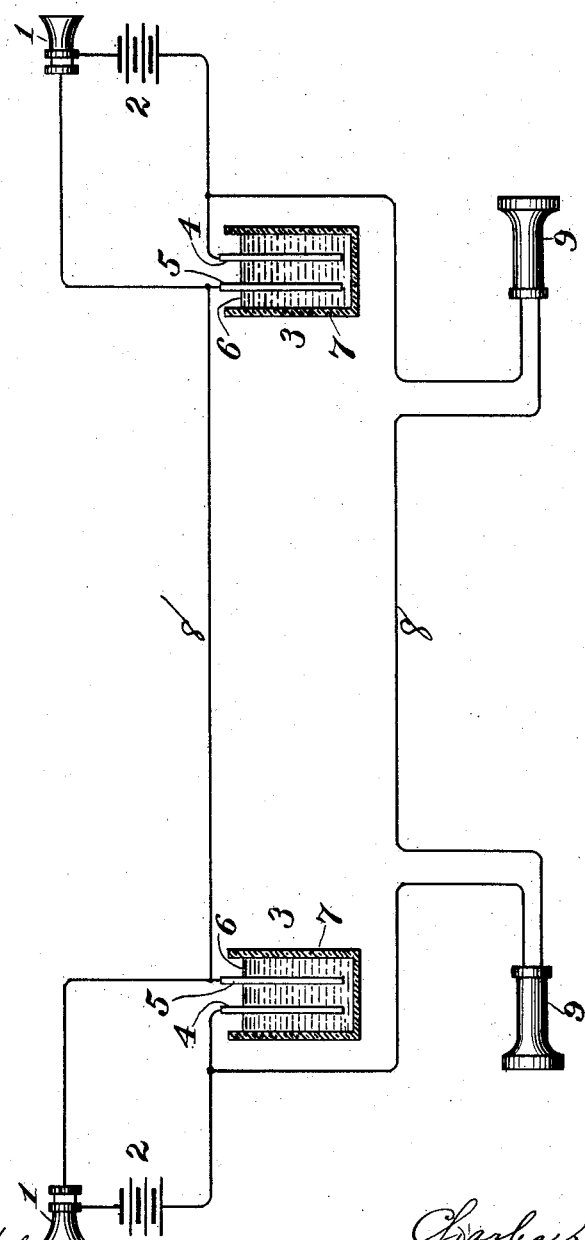
WITNESSES:
INVENTORS
Charles G. Burke
Edward J. Burke
BY
F. F. Crampton
ATTORNEY

UNITED STATES PATENT OFFICE.

CHARLES G. BURKE AND EDWARD J. BURKE, OF BROOKLYN, NEW YORK, ASSIGNORS OF ONE-HALF TO JOHN Q. A. WHITTEMORE, OF BOSTON, MASSACHUSETTS.

TELEPHONE SYSTEM.

No. 826,534. Specification of Letters Patent. Patented July 24, 1906.

Application filed August 6, 1904. Renewed May 25, 1906. Serial No. 318,744.

*To all whom it may concern:*

Be it known that we, CHARLES G. BURKE and EDWARD J. BURKE, citizens of the United States, and residents of Brooklyn, county of Kings, and State of New York, have invented new and useful Improvements in Telephone Systems, of which the following is a specification.

Our invention relates to telephone systems, and has, among other purposes, the providing of a means whereby direct battery-currents may be successfully employed for the transmission and reproduction of articulate speech over all lengths of telephone-circuits.

The invention primarily consists in introducing into a telephone-circuit a resistance additional to the ordinary variable resistance of the microphone-transmitter, such additional resistance being capable of being varied by variations of the battery-current in the circuit of the transmitter and to a degree corresponding with the extent of such variations.

The invention also consists in providing a battery and a device for producing a counter electromotive force and so connecting them in a telephone-circuit as to improve the transmission.

The invention also consists in providing a battery connected to a main line and a device for producing a counter electromotive force connected in a shunt-circuit.

The invention also consists in providing a battery connected to a main line and an electrolytic cell connected in a shunt-circuit.

The invention also consists in providing a battery, a transmitter, and an electrolytic cell connected in a circuit, a telephone connected in a main-line circuit, the said main line being connected to the said circuit on each side of the said electrolytic cell.

The invention consists in other features which appear in the following description and in the drawing filed herewith and which form a part hereof.

Referring to the drawing, the figure illustrates our invention.

1 represents transmitters connected to batteries 2. The batteries may be of any number of cells, their number depending upon the length and nature of the circuits.

The transmitters 1 and the batteries 2 are connected to devices 3 for producing a counter electromotive force. The counter-electromotive-force devices may be of any form. We, however, preferably use an electrolytic cell. It consists of two terminals 4 and 5, immersed in a suitable electrolyte. The terminals may be in the form of plates or in the form of rods and may be formed of any material suitable for their purpose. In the preferred form of our invention the terminals 4 and 5 are formed of carbon. The terminals are inserted in an electrolytic fluid 6, contained in a receptacle 7. The electrolytic fluid 6 may be water, acidulated or unacidulated, or any other fluid that will produce an electromotive force counter to that producing or tending to produce an electrolysis of the fluid. In the system illustrated ordinary unacidulated water is used. Any number of cells may be used, and they may be connected in series or in parallel.

The electrolytic cell operates as a variable resistance to produce a variable electromotive force according as the transmitter is varied in resistance by the sound produced by one speaking in the transmitter, which in turn varies the effective electromotive force produced at the terminals of the line. The variable resistance of the electrolytic cell produced by varying current passing through the cell produces pulsations on the main line, which coöperate with and magnify the electric pulsations produced by the transmitter.

The main line 8 is also connected to the transmitter 1 and the battery 2 and at the same time to the terminals 4 and 5 at each end of the line. The devices for producing counter electromotive force are thus connected in shunt-circuits to the batteries and transmitters. Telephone-receivers 9 are preferably connected in the main-line circuit 8.

In the operation of the system the current of the batteries pass through the transmitter, the main line, and the electrolytic cells. As the current of the batteries is varied by the transmitters the current of the electrolytic cells coöperates therewith to affect the receivers to produce clearness of transmission. The electrolytic cells also coöperate with the current on the main-line circuit and magnify the degree of transmission of the sound.

The invention may be varied by those skilled in the art without departing from the spirit thereof.

What we claim, and desire to secure by Letters Patent, is as follows:

1. In a telephone system the combination of a main line a battery, a transmitter, a device for producing a counter electromotor force connected in series with the said battery and the said transmitter and in parallel with the said main-line circuit.

2. In a telephone system the combination of a main line, a battery and a transmitter connected in series with the said main line, an electrolytic cell connected in a shunt-circuit to the said battery and transmitter.

3. In a telephone system the combination of a battery, a transmitter and an electrolytic cell connected in series, a main line, a receiver connected in the main line, the said main line being connected to the said circuit on each side of the electrolytic cell.

4. In a telephone system the combination of a battery a transmitter, a device for producing a variable resistance connected in series with the said battery of the said transmitter, and in parallel with the main line.

In testimony whereof we have signed our names to this specification in the presence of two subscribing witnesses.

CHARLES G. BURKE.
    EDWARD J. BURKE.

Witnesses:
 EDWIN SEGER,
 GEO. W. MILLS, Jr.